(12) United States Patent
Gavlin et al.

(10) Patent No.: US 6,177,597 B1
(45) Date of Patent: Jan. 23, 2001

(54) GLYCOL SOLVENTS AND PROCESS

(75) Inventors: Gilbert Gavlin, Lincolwood; Boris Goltsin, Skokie, both of IL (US)

(73) Assignee: Gavlin Associates, Inc.

( * ) Notice: Under 35 U.S.C. 154(b), the term of this patent shall be extended for 0 days.

(21) Appl. No.: 09/347,737

(22) Filed: Jul. 6, 1999

(51) Int. Cl.$^7$ ..................................................... B01D 47/06
(52) U.S. Cl. ............................. 568/853; 95/231; 96/295; 96/322
(58) Field of Search ............................ 45/231, 149, 230; 96/243, 322, 327, 290, 295; 568/852, 853

(56) References Cited

U.S. PATENT DOCUMENTS

| | | | |
|---|---|---|---|
| 1,866,560 | * 7/1932 | Gordon et al. | 95/231 |
| 2,603,311 | * 7/1952 | Frazier et al. | 95/231 |
| 2,988,171 | * 6/1961 | Arnold et al. | 95/231 |
| 3,349,544 | * 10/1967 | Arnold et al. | 95/231 |
| 4,602,920 | * 7/1986 | Diaz et al. | 95/231 |
| 4,979,965 | * 12/1990 | Sanholm | 95/231 |
| 5,127,231 | * 7/1992 | Larue et al. | 95/231 |
| 5,462,584 | * 10/1995 | Gavlin et al. | 95/231 |
| 5,725,637 | * 3/1998 | Gavlin et al. | 95/231 |
| 5,853,458 | * 12/1998 | Gavlin et al. | 95/231 |
| 5,922,109 | * 7/1999 | Rooney et al. | 95/231 |

OTHER PUBLICATIONS

A.L. Kohl and F.C. Kiesnnfeld, Gas Purification, Fourth Ed, Gulf Publishing Co., Houston, 1958, Chapter 11, pp 582–629.

T.C. LD, M.H.I. Baird, and C. Hanson, Handbook of Solvent Extraction, John Wiley and Sons, New York, 1983, Chapter 18.2, pp 519–521.

Arzik, Sevgi, Yildiran, Huseyin (Kimya Bolumubornova) Reappraisal of Radii For Tetralkylammdnium ions, E.U. Fen Faicultesi, Izmir, Turk. J. Fac. Ege Univ., Ser. A, 1996, 19(1)74–80(Eng.).

B. Albert and M. Jansen, Zur Solvens prein Darstellung ion Tetramethylammonim salzen, Zeit.Anorg.Allg.Chemie, 621, (1995) 1735–1740.

* cited by examiner

Primary Examiner—Duane S. Smith
(74) Attorney, Agent, or Firm—John L. Hutchinson

(57) ABSTRACT

A glycol solvent selected from a glycol and a tetramethylammonium carboxylate having improved dehydrating capacity and a reduced aborbency for aliphatic and aromatic hydrocarbons.

12 Claims, No Drawings

GLYCOL SOLVENTS AND PROCESS

FIELD OF INVENTION

This invention relates to improving the action of glycol solvents and, particularly, ethylene and polyethylene glycols for use more efficiently in a wide variety of applications.

OBJECTS

One of the objects of the invention is to improve the dehydration ability of a glycol solvent.

Another object is to provide a glycol solvent having superior ability for use in dehydrating natural gas, while concurrently having a reduced capacity for absorbing aliphatic and aromatic hydrocarbons.

A further object is to provide a glycol solvent having a selective difference in solubility between aliphatic and aromatic hydrocarbons.

BACKGROUND OF INVENTION

Glycol solvent such as ethylene and polyethylene glycol solvents are used in a number of important industrial applications, for example, dehydration of natural gas, production of anhydrous ethanol and other water soluble solvents and in separation of aromatic hydrocarbons from petroleum fractions. Examples of glycol solvents are tetraethylene glycol, triethylene glycol, diethylene glycol and ethylene glycol. Such glycols usually contain between about 0% to 5% by weight of water.

The use of glycols for dehydration of gases and, particularly, natural gas is disclosed in some detail in Chapter 11 of Gas Purification, Fourth Edition, Kohl and Riesenfeld, 1985. The principal glycols used in gas dehydration are diethylene glycol and triethylene glycol. As stated in the foregoing publication, the factors leading to the use of glycols are their unusual hygroscopicity, their excellent stability to heat and chemical decomposition, and their low vapor pressure. The dehydration process involves the use of a counter current system wherein the glycol stream containing from about 1% to 5% water is contacted with an upward flow of gas to be dehydrated, generally in the temperature range of about 85° to 105° F. After the dehydration process, the diluted glycol stream is regenerated or reconcentrated by distilling out the water absorbed, at atmospheric pressure at a reboiler temperature that does not exceed 400° F.

The glycols as indicated above have also been used in the production of anhydrous ethanol and other water soluble type compositions to remove water. Ethanol when derived from a corn base as an additive to gasoline is initially formed as a solution of up to about 50% water. For use as a gasoline additive the water must be removed, by fractional and extractive distillation with a water solvent, such as one of the aforementioned glycols.

Further, the separation of aromatic hydrocarbons, such as the BTEX components (benzene, toluene, ethyl benzene and xylene), from petroleum fractions by liquid-liquid extraction frequently use as solvents glycols and, in particular, diethylene glycol (DEG) and triethylene glycol (TEG). A brief review of this process and improvements is available in Chapter 18.2. Handbook of Solvent Extraction, John Wiley & Sons, 1983.

DESCRIPTION OF THE INVENTION

While the present invention has utility in a variety of applications, its use primarily in the dehydration of natural gas will be described as a matter of illustration.

In our U.S. Pat. No. 5,853,458, we have disclosed the use of glycols as defined herein in combination with a potassium carboxylate, such as potassium formate or potassium acetate, to improve the dehydration capabilities of the glycol solvents. Also, as a result of further research, we discovered that the use of a neopentyl alcohol, such as a pentaerythritol, in combination with a potassium carboxylate and a glycol solvent would further enhance the drying capabilities of the solvent combination.

Concurrently in the dehydration of natural gas, it was found that those glycol solvents identified in our U.S. Pat. No. 5,853,458 reduced the absorbency of the BTEX components (benzene, toluene, ethyl benzene and xylene) in the glycol solvent. In the dehydration of natural gas, it is desirable that the BTEX components remain with the dehydrated natural gas and not be absorbed in the solvent. Subsequent regeneration of the solvent will result in discharge of the BTEX components into the atmosphere. Any such discharge of these BTEX components into the atmosphere is deemed prohibitive by the EPA. While the percentage of BTEX components in natural gas is relatively small when the millions of cubic feet of gas being used is considered, the amount of BTEX components that could be discharged into the atmosphere will be of the order of hundreds of tons per year.

In an effort to continue to improve the capability of the glycol solvents, both as to dehydration and reduction of BTEX absorbency, further research has developed a new compound that achieves further markedly improved results. This new compound is a tetramethylammonium carboxylate, primarily tetramethylammonium formate or the corresponding acetate. The four methyl groups covalently linked to nitrogen are arranged tetrahedrally just as are four groups attached to carbon atom in a compound of tetravalent carbon. In comparison to potassium ion with a radius of 1.33A, tetramethylammonium ion is reported by Husseyin, et al to have a radius of 3.01A.

The tetramethylammonium formate has a melting point greater than 240° C. This compares to potassium formate previously suggested for the same use, having a melting point of 167° C. Unlike other strongly ionic crystals, TMAF is unusually soluble in organic solvents, perhaps due to both cation and anion ability to form strong coordinate association. Differential thermal analysis by Albert and Jansen has shown the decomposition temperature to be about 315° C., which is highly stable for the proposed use herein contemplated.

The prior glycol solvent's additives described in our U.S. Pat. No. 5,853,458, namely potassium formate and neopentyl alcohol, were found to perform as anticipated at 40° C. However, at room temperature, the viscosity of the composition can be of the order of 1000 centipoises. Storage under winter conditions would require special handling of the composition, which problem is not present with regard to the TMAF composition of the present invention.

In developing data regarding the solubility of saturated hydrocarbons such as methane and BTEX compounds in TMAF composition, hexane was used as a surrogate for methane and benzene was used as the most prominent BTEX compound in natural gas.

Following are a series of tables of data relating to solubility, viscosity, etc. of hydrocarbons and TMAF and TMAF as compared to potassium formate and a neopentyl alcohol in customary ethylene type glycols, wherein the following abbreviations are applicable in the various examples:

nd; not detected

KOF; potassium formate

TEG; triethylene glycol

DEG; diethylene glycol

TP; 1,1,1,-trimethylolpropane (a neopentyl alcohol)

TMAF; tetramethylammonium formate

TABLE 1

SOLUBILITY OF HYDROCARBONS IN TEG (wt %)

| | |
|---|---|
| Water (wt %) | 2.0 |
| Hexane | 1.5 |
| Benzene | 36.7 |

TABLE 2

MAXIMUM USABLE SALT SOLUBILITY (wt % @ 25° C.)

| | TEG | DEG |
|---|---|---|
| KOF | 20 | 25 |
| TMAF | 32 | 38 |

As will be noted in the above data, more TMAF can be incorporated into the respective glycol compounds than KOF, which is significant in utilizing the more effective TMAF.

TABLE 3

VISCOSITIES (cps)

| | Dry | | 2% $H_2O$ | |
|---|---|---|---|---|
| WT % | 25° C. | 40° C. | 25° C. | 40° C. |
| KOF 20-TEG 80 | 260 | 90 | 194 | 66 |
| KOF 25-DEG 75 | 275 | 93 | 207 | 71 |
| TMAF 32-TEG 68 | 52 | 22 | 40 | 21 |
| TMAF 38-DEG 62 | 37 | 16 | 27 | 15 |

The data in Table 3 demonstrates the advantage of the lower viscosity of TMAF as compared to KOF in TEG and DEG at room temperatures and at elevated temperatures.

TABLE 4

SOLVENT SOLUBILITIES (wt % @ 25° C.)

| | Hexane | | Benzene | |
|---|---|---|---|---|
| | Dry | 2% $H_2O$ | Dry | 2% $H_2O$ |
| KOF 20-TEG 80 | 0.01 | 0.01 | 20.0 | 16.0 |
| KOF 25-DEG 75 | 0.01 | 0.01 | 16.5 | 12.9 |
| TMAF 32-TEG 68 | 0.01 | 0.01 | 14.5 | 13.1 |
| TMAF 38-DEG 62 | 0.007 | 0.002 | 12.8 | 11.2 |

From the above Table 4, it can be seen that the solubility of benzene in the TMAF compositions is appreciably less than in the comparable KOF compositions, which directly relates to the objective of this invention, namely, reducing the absorbency of BTEX to compounds in a drying solution.

TABLE 5

TMAF-TEG-TP COMPOSITIONS

TEG Compositions, w %

| | | | | |
|---|---|---|---|---|
| | TEG = 66.2 | TEG = 59.6 | TEG = 53.0 | TEG = 39.8 |
| | TMAF = 32.6 | TMAF = 29.3 | TMAF = 26.0 | TMAF = 19.5 |
| | | TP = 10.0 | TP = 20.0 | TP = 40.0 |
| | $H_2O$ = 1.2 | $H_2O$ = 1.1 | $H_2O$ = 1.0 | $H_2O$ = 0.8 |
| Viscosity, cps | | | | |
| at 25° C. | 55 | 87 | 112 | 250 |
| at 40° C. | — | 44 | 58 | 100 |
| Solubility, w % | | | | |
| Hexane | | | 0.0007 | nd |
| Benzene | | | 0.1 | 0.15 |

TABLE 6

TMAF-DEG-TP COMPOSITIONS

DEG Compositions w %

| | | | | |
|---|---|---|---|---|
| | DEG = 60.6 | DEG = 54.6 | DEG = 48.5 | DEG = 36.4 |
| | TMAF = 37.8 | TMAF = 34.0 | TMAF = 30.2 | TMAF = 22.6 |
| | | TP = 10.0 | TP = 20.0 | TP = 40.0 |
| | $H_2O$ = 1.5 | $H_2O$ = 1.4 | $H_2O$ = 1.3 | $H_2O$ = 0.9 |
| Viscosity, cps | | | | |
| at 25° C. | 37 | 65 | 83 | 200 |
| at 40° C. | — | 30 | 45 | 85 |
| Solubility, w % | | | | |
| Hexane | | | 0.0005 | nd |
| Benzene | | | 0.2 | 0.2 |

The data in Tables 5 and 6 reflect the influence of adding a neopentyl alcohol, such as 1,1,1-trimethylolpropane, to a solvent composed of TMAF and either TEG or DEG. Basically, the addition of the neopentyl alcohol will operate to increase the viscosity of the solvent. However, it will be noted that the presence of the neopentyl alcohol tends to reduce the solvency of the hydrocarbons in the solvent. Depending upon the particular circumstances of a dehydration process, "tailor-made" compositions can be developed for specific applications.

The TMAF composition of this invention has been found to offer distinct advantages over our prior compositions, as disclosed in our U.S. Pat. No. 5,853,458. TMAF has been found to be highly hydroscopic for use in drying gases, with a corresponding low absorbency rate for hydrocarbons and, particularly, the BTEX compounds. Further and equally important, it has an appreciably better viscosity, enabling it to be more readily combined with glycol solvents for drying gases at varying temperatures or for storing at lower temperatures.

TMAF can be readily mixed with any of the glycols mentioned herein, but will primarily be used with the current preferred triethylene glycol or diethylene glycol in an amount ranging to preferably between about 10% and 38% by weight, depending upon the specific glycol solvent.

As indicated in Tables 5 and 6, a neopentyl alcohol may be added to a TEG or DEG composition containing TMAF in a preferred range of up to about 20% by weight to maintain the best viscosity. Also, as emphasized, the particular composition of a gas, such as natural gas, as to water and BTEX components, will determine the composition of the solvents proposed by this invention to achieve the optimum results.

While the examples of the invention have emphasized its use in dehydration of natural gas, other uses for the unique qualities of the invention may be found in, for example, liquid-liquid extraction for separation of aliphatic from aromatic compounds.

Having described the invention and certain embodiments thereof, the same is only intended to be limited by the scope of the following claims.

What is claimed is:

1. A glycol solvent comprising a glycol selected from the group consisting of ethylene glycol, diethylene glycol, tri-ethylene glycol and tetra-ethylene glycol, and a quanternary ammonium carboxylate selected from the group consisting of tetramethylammonium formate and tetramethylammonium acetate.

2. A glycol solvent as described in claim 1 wherein the tetramethylammonium carboxylate is tetramethylammonium formate.

3. A glycol solvent as described in claim 2 wherein the glycol is selected from the group consisting of diethylene glycol and triethylene glycol.

4. A glycol solvent as described in claim 3 which includes up to about 5% of water by weight.

5. A glycol solvent as described in claim 3 which includes a neopentyl alcohol.

6. A process for dehydrating a gas which comprises contacting said gas with a glycol solvent comprising a glycol selected from the group consisting of ethylene glycol, diethylene glycol, triethylene glycol and tetraethylene glycol, and a tetramethylammonium carboxylate selected from the group consisting of tetramethylammonium formate and tetramethylammonium acetate.

7. A process as described in claim 6 wherein the gas is natural gas.

8. A process as described in claim 7 wherein the glycol is selected from the group consisting of diethylene glycol and triethylene glycol.

9. A process as described in claim 8 wherein the tetramethylammonium carboxylate is tetramethylammonium formate.

10. A process as described in claim 9 wherein the glycol solvent includes up to about 5% of water by weight.

11. A process as described in claim 9 wherein the glycol solvent includes a neopentyl alcohol.

12. A process as described in claim 7 wherein said glycol solvent and said natural gas are contacted in a counter current system.

* * * * *